Figure 6:
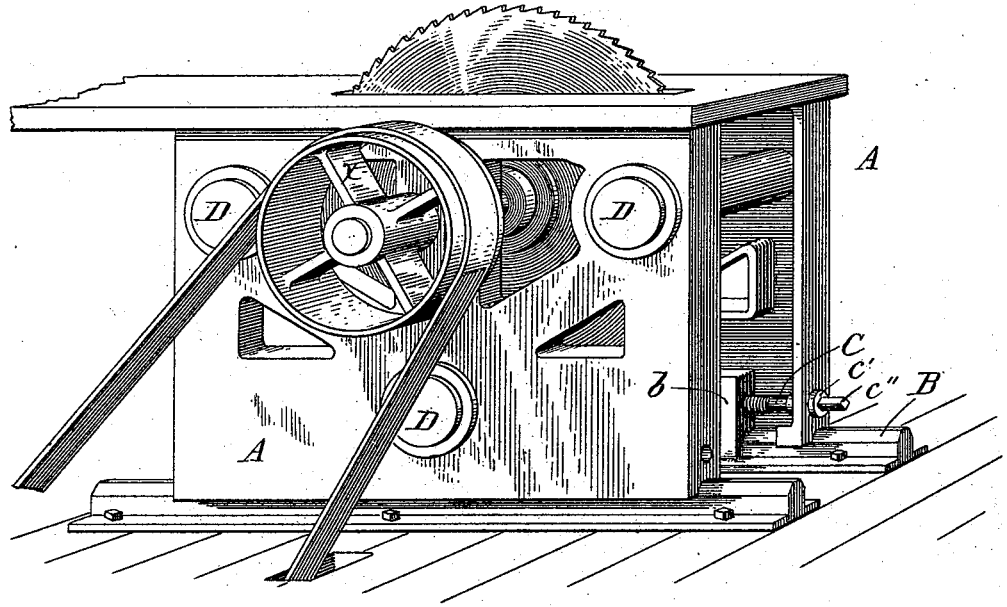

(No Model.) 2 Sheets—Sheet 1.
M. WADDELL.
BELT TIGHTENER.
No. 528,242. Patented Oct. 30, 1894.
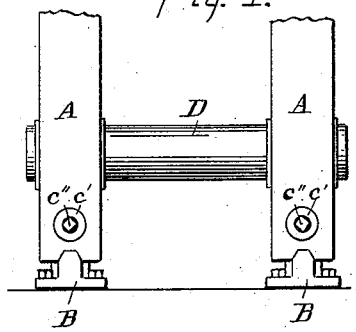
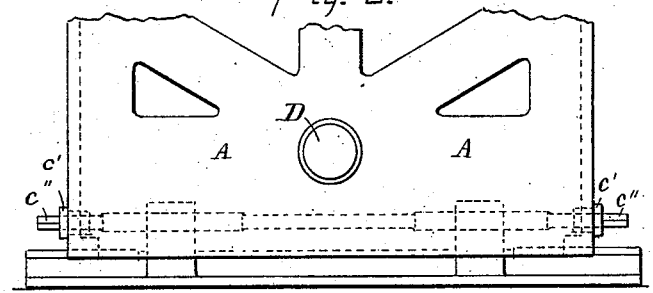
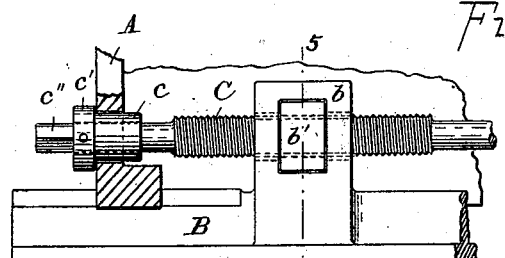
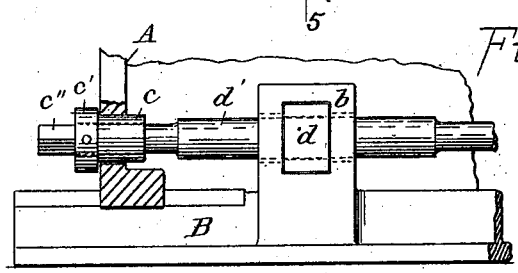
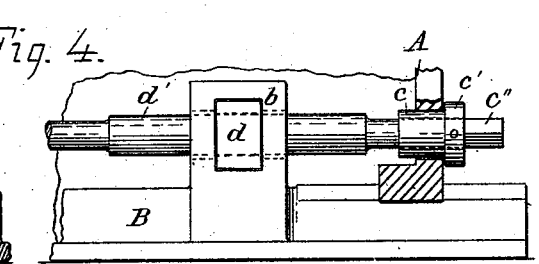
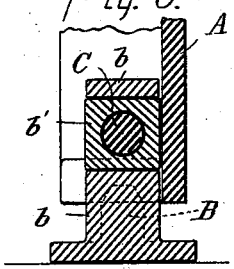
WITNESSES:
INVENTOR
Montgomery Waddell,
BY
Brieven & Knauth
ATTORNEYS.

(No Model.)   M. WADDELL.   2 Sheets—Sheet 2.
BELT TIGHTENER.

No. 528,242.   Patented Oct. 30, 1894.

WITNESSES:

INVENTOR
Montgomery Waddell
BY
ATTORNEYS.

UNITED STATES PATENT OFFICE.

MONTGOMERY WADDELL, OF BRIDGEPORT, CONNECTICUT, ASSIGNOR TO MONTGOMERY WADDELL, RECEIVER OF THE WADDELL-ENTZ COMPANY, OF WEST VIRGINIA.

BELT-TIGHTENER.

SPECIFICATION forming part of Letters Patent No. 528,242, dated October 30, 1894.

Application filed June 24, 1893. Serial No. 478,700. (No model.)

*To all whom it may concern:*

Be it known that I, MONTGOMERY WADDELL, a resident of Bridgeport, Fairfield county, Connecticut, have invented an Improved Belt-Tightener, of which the following is a specification.

My present invention relates to belt tighteners and has for its object to produce a construction which shall be simple, cheap and reliable, and which can be repaired at small cost. I attain these objects by mechanism illustrated in the accompanying drawings, showing one form of my invention, and in which—

Figure 1 is an end view of my improved belt tightener partly broken away. Fig. 2 is a side view of the same showing some of the parts in dotted lines. Fig. 3 is an enlarged detail view of one member of the carriage, partly broken away. Fig. 4 is an enlarged detail view of the other member of the carriage, partly broken away. Fig. 5 is a section on line 5—5 of Fig. 3. Fig. 6 is an end view of a machine embodying my invention.

A A are standards constituting a frame or carriage joined together in any suitable manner as by a bolt or brace D. This carriage serves to support a machine or pulley $x$ (Fig. 6) and rests and traverses upon rails B.

The rails B have integral therewith studs or projections $b$ recessed or perforated to receive the notch $b'$ and also for the passage of the threaded rod C which passes through the nuts $b'$. (See Figs. 3 and 5.)

Secured near the ends of the rod C are thimbles $c$ entering apertures in the standard, and having collars $c'$ bearing against the standard A as shown to receive the thrust and cause the carriage to move longitudinally with the threaded rod C.

The rod C has squared ends $c''$ to be engaged by the jaws of a wrench used to turn the rod.

The foregoing description applies to one standard or member of the carriage as illustrated in Fig. 3. The other side or member may be similar in all respects, or I may make use of the construction illustrated in Fig. 4, wherein, instead of a threaded rod and nut as in Fig. 3, there is shown a dummy consisting of perforated blocks $d$ mounted in the studs $b$ and a plain rod $d'$ passing loosely through the studs and blocks. The rod $d$ may be provided with thimbles and have its ends squared as shown in Fig. 4.

The operation is as follows: A machine or pulley is mounted on the movable carriage. Rotation of the threaded rod will cause it to be fed forward in the nut and move the carriage on the rails. On the carriage is mounted a machine or pulley coupled by a belt to other machinery placed in such relation that the motion of the carriage on the rails will alter the distance of the machines apart and regulate the tension of the belt. When it is desired to tighten or loosen the belt one of the squared ends $c''$ of the threaded rod C is engaged by a suitable wrench, and the rod rotated in such direction as to cause it to traverse in the nuts and move the carriage, and consequently the machine or pulley, to produce the desired effect on the belt. The nuts $b'$ fit loosely in the apertures of $b$, and the thimbles are attached to the rod C in such a manner as to be readily removable. By removing the thimbles the rod can be unscrewed and removed from the nuts, and the nuts removed from the studs. It will be seen that when the parts have become worn or broken, they may be readily removed and new parts substituted with little trouble and expense; or if it is desired to remove the rods and nuts or blocks and replace them with others of different pitch, it may readily be done. The plain rod $d'$ and the blocks $d$ may be removed by removing the collars and drawing out the rod.

I have shown and described two studs on each rail, but it will be understood that for light machinery and light tension one stud and its nut on each will be sufficient.

While I have shown my belt tightener applied to a saw it is obvious that it may be used in any other relation.

It will be observed that by my invention I am enabled to construct a reliable belt tightener at little cost, which has no projecting parts and in which there is a positive locking between the frame of the machine and the rails which carry the same.

Having described my invention, I claim—

1. In a belt tightener, the combination of a carriage, rails upon which said carriage traverses, studs on the rails perforated for the reception of removable nuts, and a threaded rod secured to the carriage at both ends and passing through the nuts whereby the carriage is locked to the rails, substantially as described.

2. In a belt tightener the combination of a two part carriage, one member of which traverses upon a rail having studs thereon, removable nuts held by said studs, and a threaded rod engaging said nuts for moving the carriage, the other member thereof traversing on a rail having thereon studs perforated longitudinally and a plain rod passing through said longitudinal perforations, substantially as described.

MONTGOMERY WADDELL.

Witnesses:
HARRY M. TURK,
GEO. E. MORSE.